(12) United States Patent
Blomberg

(10) Patent No.: US 10,421,498 B2
(45) Date of Patent: Sep. 24, 2019

(54) SNOW AND RAIN DEFLECTOR ASSEMBLY FOR VEHICLES

(71) Applicant: Thomas Albert Blomberg, Riverside, CA (US)

(72) Inventor: Thomas Albert Blomberg, Riverside, CA (US)

( * ) Notice: Subject to any disclaimer, the term of this patent is extended or adjusted under 35 U.S.C. 154(b) by 0 days.

(21) Appl. No.: 16/192,867

(22) Filed: Nov. 16, 2018

(65) Prior Publication Data

US 2019/0168819 A1   Jun. 6, 2019

Related U.S. Application Data

(60) Provisional application No. 62/593,684, filed on Dec. 1, 2017.

(51) Int. Cl.
| | |
|---|---|
| *B62D 25/00* | (2006.01) |
| *B62D 25/16* | (2006.01) |
| *B62D 25/18* | (2006.01) |

(52) U.S. Cl.
CPC ......... *B62D 25/163* (2013.01); *B62D 25/188* (2013.01)

(58) Field of Classification Search
CPC .. B62D 25/163; B62D 25/188; B62D 25/182; B62D 25/166; B62D 25/168
See application file for complete search history.

(56) References Cited

U.S. PATENT DOCUMENTS

| | | | | |
|---|---|---|---|---|
| 1,780,400 | A * | 11/1930 | Nelson | B60J 3/02 248/284.1 |
| 3,333,868 | A | 8/1967 | Sogoian | |
| 3,822,897 | A | 7/1974 | Heath | |
| 3,954,281 | A * | 5/1976 | Juergens | B62D 25/188 280/851 |
| 4,541,646 | A | 9/1985 | Knowley | |
| 4,921,276 | A * | 5/1990 | Morin | B62D 25/168 280/848 |
| 6,076,842 | A * | 6/2000 | Knoer | B62D 25/188 224/42.31 |
| 6,484,984 | B2 * | 11/2002 | Hawes | B62D 25/188 248/217.3 |
| 6,485,059 | B2 | 11/2002 | Burnstein | |
| 7,213,843 | B2 * | 5/2007 | Edwards | B62D 25/182 280/154 |
| 7,407,194 | B1 | 8/2008 | Alley | |
| 7,946,531 | B2 | 5/2011 | Jackson | |
| 8,579,314 | B2 * | 11/2013 | Prazen | B62D 25/188 280/154 |
| 9,004,538 | B2 | 4/2015 | Eklund et al. | |
| 9,027,983 | B2 * | 5/2015 | Butler | B62D 25/188 296/180.4 |

(Continued)

*Primary Examiner* — Hau V Phan
(74) *Attorney, Agent, or Firm* — Jonathan M. Rixen; Charles A. Lemaire; Lemaire Patent Law Firm, P.L.L.C.

(57) ABSTRACT

A snow and rain deflector assembly for vehicles for preventing whiteout conditions on snow covered roads caused by commercial vehicles. The snow and rain deflector assembly for vehicles includes a sleeve assembly including a sleeve having a side wall and a bottom; a sleeve support assembly in communication with the sleeve and adapted to removably mount the sleeve to a vehicle such as a trailer; a panel support member removably fastened to and depending from the sleeve assembly; and panels secured to and depending from the panel support member.

20 Claims, 3 Drawing Sheets

(56) References Cited

U.S. PATENT DOCUMENTS

| | | | |
|---|---|---|---|
| 9,045,174 B2 | 6/2015 | Dixon | |
| 9,802,652 B1* | 10/2017 | Cox | B62D 25/166 |
| 2005/0113266 A1* | 5/2005 | Krull | C10L 1/143 |
| | | | 508/243 |
| 2013/0256483 A1* | 10/2013 | Dixon | B62D 25/182 |
| | | | 248/222.14 |

* cited by examiner

SNOW AND RAIN DEFLECTOR ASSEMBLY FOR VEHICLES

CROSS-REFERENCE TO RELATED APPLICATIONS

The present application claims priority to the provisional application No. 62/593,684 filed on Dec. 1, 2017, the disclosure of which is expressly incorporated by reference herein in its entirety.

BACKGROUND OF THE INVENTION

Field of the Invention

The present invention relates to vehicle flaps and more particularly pertains to a new snow and rain deflector assembly for vehicles for preventing whiteout conditions on snow covered roads caused by commercial vehicles.

Description of the Prior Art

The use of vehicle flaps is known in the prior art. More specifically, vehicle flaps heretofore devised and utilized are known to consist basically of familiar, expected and obvious structural configurations, notwithstanding the myriad of designs encompassed by the crowded prior art which have been developed for the fulfillment of countless objectives and requirements.

The prior art includes mud flaps depending from the trailers or vehicles behind the rear tires. While these devices fulfill their respective, particular objectives and requirements, the aforementioned patents do not disclose a new snow and rain deflector assembly for vehicles.

SUMMARY OF THE INVENTION

The general purpose of the present invention, which will be described subsequently in greater detail, is to provide a new snow and rain deflector assembly for vehicles which has many of the advantages of the vehicle flaps mentioned heretofore and many novel features that result in a new snow and rain deflector assembly for vehicles which is not anticipated, rendered obvious, suggested, or even implied by any of the prior art vehicle flaps, either alone or in any combination thereof. The present invention includes a sleeve assembly including a sleeve having a side wall and a bottom; a sleeve support assembly in communication with the sleeve and adapted to removably mount the sleeve to a vehicle such as a trailer; a panel support member removably fastened to and depending from the sleeve assembly; and panels secured to and depending from the panel support member. None of the prior art includes the combination of the elements of the present invention.

There has thus been outlined, rather broadly, the more important features of the snow and rain deflector assembly for vehicles in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new snow and rain deflector assembly for vehicles which has many of the advantages of the vehicle flaps mentioned heretofore and many novel features that result in a new snow and rain deflector assembly for vehicles which is not anticipated, rendered obvious, suggested, or even implied by any of the prior art vehicle flaps, either alone or in any combination thereof.

Still another object of the present invention is to provide a new snow and rain deflector assembly for vehicles for preventing whiteout conditions on snow and rain covered road caused by commercial vehicles.

Still yet another object of the present invention is to provide a new snow and rain deflector assembly for vehicles that is easy and convenient to install and doesn't require any alterations to the trailers or vehicles.

Even still another object of the present invention is to provide a new snow and rain deflector assembly for vehicles that is set up for universal installation.

These together with other objects of the invention, along, with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
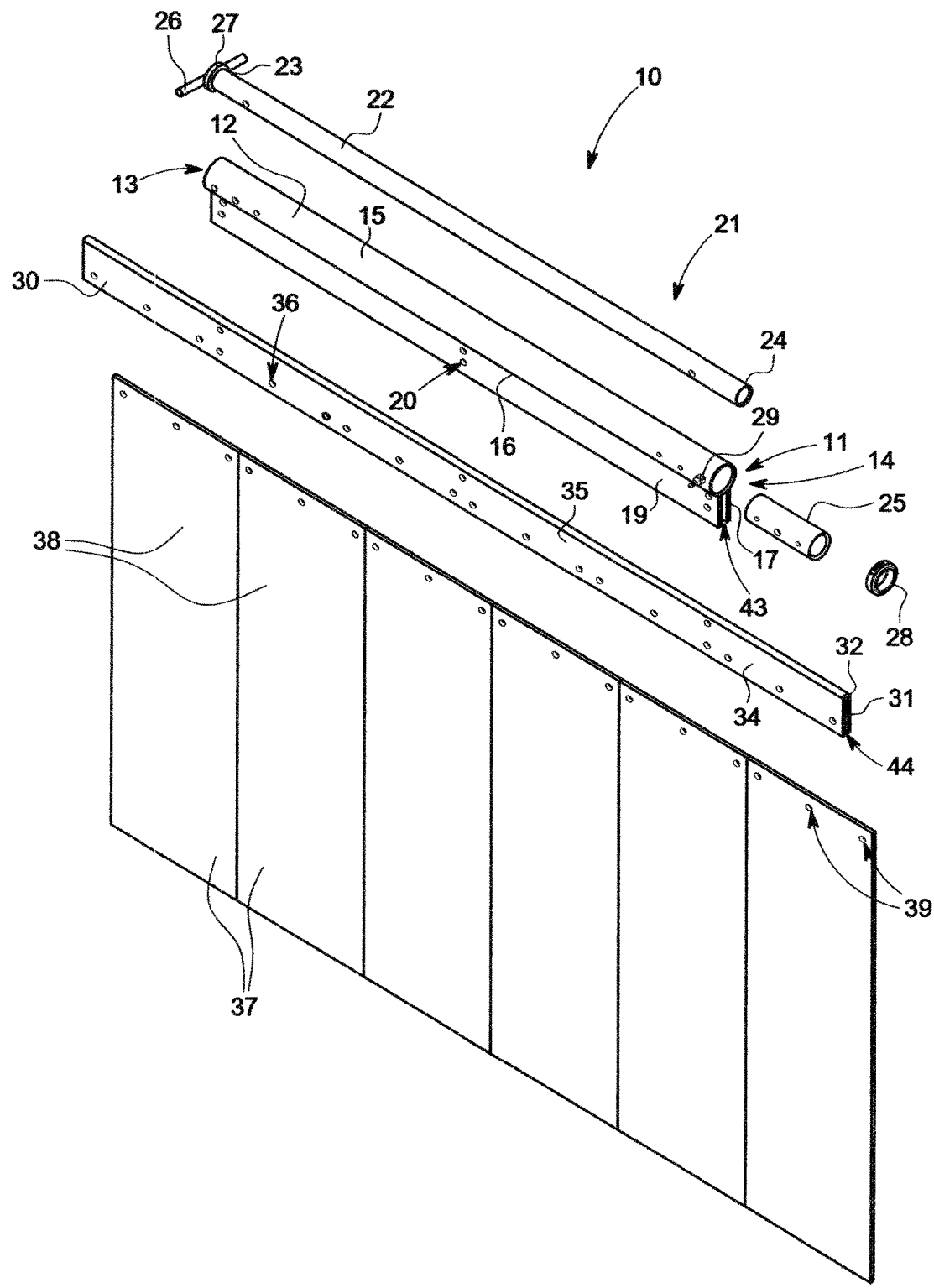
FIG. 1 is an exploded perspective view of a new snow and rain deflector assembly for vehicles according to the present invention.
Figure 2:
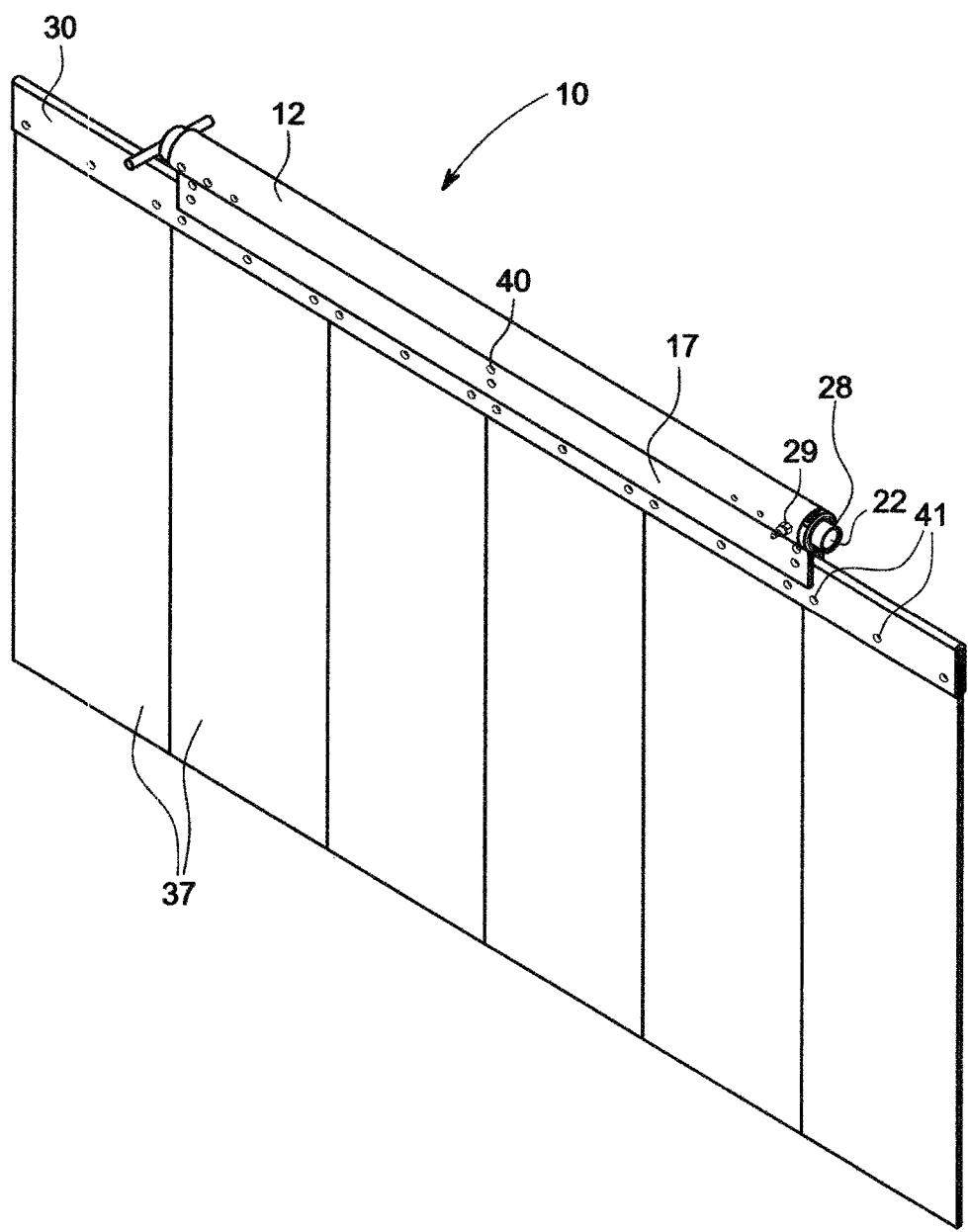
FIG. 2 is a perspective view of the present invention.
Figure 3:
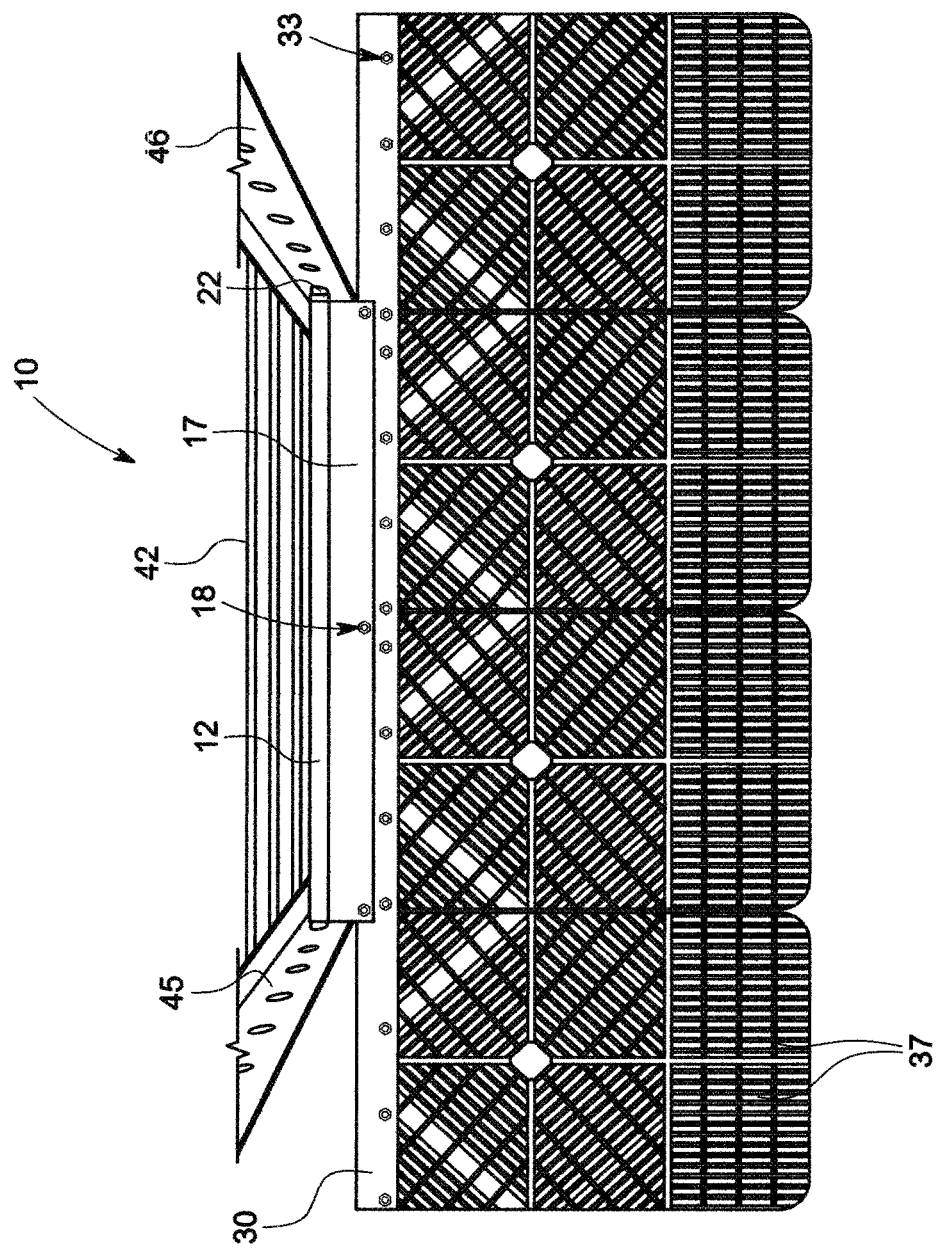
FIG. 3 is a front elevation view of the present invention in use attached to a vehicle.

With reference now to the drawings, and in particular to FIGS. 1 through 3 thereof, a new snow and rain deflector assembly for vehicles embodying the principles and concepts of the present invention and generally designated by the reference numeral 15 will be described.

As best illustrated in FIGS. 1 through 3, the snow and rain deflector assembly for vehicles 10 generally comprises a sleeve assembly 11 including a sleeve 12 having a side wall 15 and a bottom 16; a sleeve support assembly 21 in communication with the sleeve 12 and adapted to removably mount the sleeve 12 to a vehicle 42 such as a trailer; an elongated panel support member 30 removably and conventionally fastened to and depending from the sleeve assembly 11; and panels 37 conventionally secured to and depending from the panel support member 30.

The sleeve assembly 11 also includes a pair of flanges 17, 19 conventionally secured and welded to and extending outwardly from the bottom 16 of the sleeve 12 and extending a length of the sleeve 12. The flanges 17, 19 are spaced apart and disposed parallel to one another and form a channel 43 therebetween with holes 18, 20 disposed through the flanges 17, 19. The sleeve 12 has an open proximate end 13 and an open distal end 14 with a lubricant fitting 29 conventionally disposed in and through the side wall 15 of the sleeve 12 proximate to the distal end 14 for injecting lubricant into the sleeve 12.

The sleeve support assembly 21 includes an elongated support member 22 having a proximate end 23 and a distal end 24 and being removably disposed in the sleeve 12 and through the ends 13, 14 of the sleeve 12. The sleeve support assembly 21 also includes a bushing 25 removably disposed in and at the distal end 15 of the sleeve 12. The bushing 25 is disposed adjacent to the lubricant fitting 29 with the lubricant injected into the sleeve 12 so that the bushing 25 moves freely within the sleeve 12. The sleeve support assembly 21 further includes split collars 27, 28 removably engaged about the support member 22 at the proximate and distal ends 23, 24 of the support member 22 to secure the sleeve 12 to the support member 22 and to secure the support member 22 to elongated frame members 45, 46 at a back of the vehicle 42. The sleeve support assembly 21 also has a handle 26 conventionally attached to the proximate end 23 of the support member 22.

The elongated panel support member 30 has a planar first portion 31 and a planar second portion 34 spaced apart from and facing the first portion 31 and forming a channel 44 therebetween. The first and second portions 31, 34 have upper portions 32, 35 disposed in the channel 43 of the sleeve assembly 11. The upper portions 32, 35 of the first and second portions 31, 24 have holes 33, 36 disposed therethrough for receiving fasteners 40 for fastening the first and second portions 31, 34 to the flanges 17, 19 of the sleeve assembly 11. The elongated panel support member 30 extends outwardly beyond the proximate and distal ends 14, 15 of the sleeve 12. The panels 37 are arranged side by side and are securely disposed in the channel 44 of the panel support member 30. Each of the panels 37 has an upper portion 38 with holes 39 disposed therethrough. The upper portions 38 of the panels 37 are received and fastened with fastening members 41 in the channel 44 of the panel support member 30 with the panels 37 depending from the panel support member 30 and arranged slide by side along an entire length of the panel support member 30.

In use, the panels 37 allow air to flow between the panels 37 so as not to add drag to the vehicle 42 and as the vehicle 42 is moved upon a road. Any snow or rain on the road or any other debris won't be picked up by the vehicle 42 and will not cause any whiteout conditions for other vehicles trailing behind and thus eliminating dangerous driving conditions. Every year come winter time people that live in snowbelt states know all too well what happens when a vehicle 42 with high ground clearance passes them on snow-covered roads. Snow, rain, and ice is sprayed off the back tires of these large vehicles 42 causing a type of road hazard that will inevitably lead to temporary blinding white out conditions. This often times results in loss of other vehicle's control, and in some cases personal injuries will occur both minor and major. This invention is specifically designed to improve public safety by breaking down the moisture spray coming off the rear tires before a cloud is formed. This will increase visibility for all vehicles following in close proximity on snow and rain covered roads. This device easily attaches to most commercial 53 foot box trailers, This type of equipment is widely used in North America and most certainly keeps America moving. Many people will be affected this winter by these inevitable road hazards, but with the help this invention, American highways and byways will be safer for all during adverse road and weather conditions.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the snow and rain deflector assembly for vehicles. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A snow and rain deflector assembly for vehicles comprising:
    a sleeve assembly including a sleeve having a side wall and a bottom;
    a sleeve support assembly in communication with the sleeve and adapted to removably mount the sleeve to a vehicle trailer;
    an elongated panel support member removably fastened to and depending from the sleeve assembly;
    panels secured to and depending from the panel support member;
    wherein the sleeve assembly also includes a pair of flanges secured to and extending outwardly from the bottom of the sleeve and extending a length of the sleeve, wherein the flanges are spaced apart and disposed parallel to one another and form a channel therebetween with holes disposed through the flanges; and
    wherein the elongated panel support member has a planar first portion and a planar second portion spaced apart from and facing the first portion and forming a channel therebetween.

2. The snow and rain deflector assembly for vehicles as described in claim 1, wherein the sleeve has an open proximate end and an open distal end with a lubricant fitting disposed in and through the side wall of the sleeve proximate to the distal end for injecting lubricant into the sleeve.

3. The snow and rain deflector assembly for vehicles as described in claim 1, wherein the sleeve has an open proximate end and an open distal end, wherein the sleeve support assembly includes an elongated support member having a proximate end and a distal end and being removably disposed in the sleeve and through the open ends of the sleeve.

4. The snow and rain deflector assembly for vehicles as described in claim 3, wherein the sleeve support assembly further includes split collars removably engaged about the support member at the proximate and distal ends of the support member to secure the sleeve to the support member and to secure the support member to elongated frame members at a back of the vehicle.

5. The snow and rain deflector assembly for vehicles as described in claim 3, wherein the sleeve support assembly also has a handle attached to the proximate end of the support member.

6. The snow and rain deflector assembly for vehicles as described in claim 1, wherein the sleeve has an open proximate end and an open distal end, wherein the sleeve support assembly also includes a bushing removably disposed in and at the distal end of the sleeve.

7. The snow and rain deflector assembly for vehicles as described in claim 6, wherein a lubricant fitting is disposed in and through the side wall of the sleeve proximate to the distal end for injecting lubricant into the sleeve, and wherein the bushing is disposed adjacent to the lubricant fitting with the lubricant injected into the sleeve so that the bushing moves freely within the sleeve.

8. The snow and rain deflector assembly for vehicles as described in claim 1, wherein the first and second portions have upper portions disposed in the channel of the sleeve assembly, wherein the upper portions of the first and second portions have holes disposed therethrough for receiving fasteners for fastening the first and second portions to the flanges of the sleeve assembly.

9. The snow and rain deflector assembly for vehicles as described in claim 1, wherein the sleeve has an open proximate end and an open distal end, and wherein the elongated panel support member extends outwardly beyond the proximate and distal ends of the sleeve.

10. The snow and rain deflector assembly for vehicles as described in claim 1, wherein the panels are arranged side by side and are securely disposed in the channel of the panel support member.

11. The snow and rain deflector assembly for vehicles as described in claim 1, wherein each of the panels has an upper portion with holes disposed therethough.

12. The snow and rain deflector assembly for vehicles as described in claim 1, wherein the upper portions of the panels are received and fastened with fastening members in the channel of the panel support member with the panels depending from the panel support member and arranged side by side along an entire length of the panel support member.

13. An apparatus comprising:
a snow-and-rain-deflector assembly that includes:
a sleeve including a circumferential sleeve side wall and first and second bottom flanges extending downward from the circumferential sleeve side wall;
a sleeve support in communication with the sleeve and adapted to removably mount the sleeve to a vehicle trailer;
an elongated panel support member removably fastened to the first and second bottom flanges; and
a plurality of panels secured to and depending from the elongated panel support member,
wherein the plurality of panels are arranged side by side along an entire length of the panel support member.

14. The apparatus of claim 13,
wherein the sleeve has an open proximate end and an open distal end, and
wherein the sleeve support also includes a bushing removably disposed in and at the distal end of the sleeve.

15. The apparatus of claim 13,
wherein the sleeve has open ends,
wherein the sleeve support includes a handle,
wherein the sleeve support is removably disposed in the circumferential sleeve side wall, and
wherein the sleeve support extends lengthwise out the open ends of the sleeve to attach the sleeve support to the vehicle trailer.

16. The apparatus of claim 13,
wherein the sleeve has an open proximate end and an open distal end,
wherein the sleeve support has a proximate end and a distal end, wherein the sleeve support is removably disposed in the sleeve, wherein the sleeve support extends out through the open proximate and distal ends of the sleeve, and
wherein the sleeve support further includes split collars removably engaged about the sleeve support at the proximate and distal ends of the sleeve support member to secure the sleeve to the sleeve support and to secure the sleeve support to elongated frame members at a back of the vehicle trailer.

17. The apparatus of claim 13, further comprising the vehicle trailer.

18. An apparatus comprising:
a snow-and-rain-deflector assembly that includes:
a sleeve including a circumferential sleeve side wall and first and second bottom flanges extending downward from the circumferential sleeve side wall;
a sleeve support in communication with the sleeve and adapted to removably mount the sleeve to a vehicle trailer;
an elongated panel support member removably fastened to the first and second bottom flanges; and
a plurality of panels secured to and depending from the elongated panel support member,
wherein the sleeve has an open proximate end and an open distal end, and
wherein the elongated panel support member extends outwardly beyond the proximate and distal ends of the sleeve.

19. The apparatus of claim 18, further comprising:
a lubricant fitting disposed in and through the side wall of the sleeve proximate to the distal end for injecting lubricant into the sleeve.

20. The apparatus of claim 18, further comprising the vehicle trailer.

* * * * *